United States Patent [19]

Bair

[11] Patent Number: 5,135,787
[45] Date of Patent: Aug. 4, 1992

[54] ICED FOOD SHIPPING CONTAINER WITH AQUEOUS LIQUID ABSORBING PAD

[75] Inventor: Thomas I. Bair, Wilmington, Del.

[73] Assignee: E. I. Du Pont de Nemours and Company, Wilmington, Del.

[21] Appl. No.: 567,252

[22] Filed: Aug. 14, 1990

[51] Int. Cl.$^5$ .............................................. F16L 3/02
[52] U.S. Cl. .................................. 428/36.1; 428/74;
428/76; 428/198; 428/219; 428/283; 428/286;
428/373; 428/402; 428/913; 426/124; 426/129;
426/393; 426/398; 220/501; 206/204
[58] Field of Search ............... 428/36.1, 283, 74, 76,
428/283, 198, 219, 286, 287, 373, 913, 402, 407;
426/124, 129, 109, 393, 398; 220/20.5; 206/204

[56] References Cited

U.S. PATENT DOCUMENTS

| 3,669,103 | 6/1972 | Harper et al. | 125/156 |
|---|---|---|---|
| 3,670,731 | 6/1972 | Harmon | 128/156 |
| 4,100,324 | 7/1978 | Anderson | 428/326 |
| 4,295,987 | 10/1981 | Parks | 252/194 |
| 4,341,215 | 7/1982 | Eldridge | 128/285 |
| 4,429,001 | 1/1984 | Kolpin et al. | 428/283 |
| 4,537,590 | 8/1985 | Pieniak | 604/379 |
| 4,578,066 | 3/1986 | O'Connor | 604/366 |
| 4,592,751 | 6/1986 | Gegelys | 604/368 |
| 4,654,038 | 3/1987 | Sakurai | 604/368 |
| 4,654,039 | 3/1987 | Brandt et al. | 604/368 |
| 4,784,892 | 11/1988 | Storey et al. | 428/172 |
| 4,826,498 | 5/1989 | Kocsah | 604/383 |
| 4,842,594 | 6/1989 | Ness | 604/368 |
| 4,869,387 | 9/1989 | Persson | 220/4.27 |
| 4,886,509 | 12/1989 | Mattsson | 604/349 |
| 4,892,533 | 1/1990 | Le-Khac | 604/368 |
| 4,929,480 | 5/1990 | Midkiff et al. | 428/35.6 |
| 4,940,621 | 7/1990 | Rhodes et al. | 426/124 |

FOREIGN PATENT DOCUMENTS 88306757.1 7/1988 European Pat. Off. .

Primary Examiner—Ellis P. Robinson
Assistant Examiner—J. Weddington

[57] ABSTRACT

An iced food shipping container and a novel aqueous liquid absorbing pad for use therein are provided. The pad comprises superabsorbing polymer particles distributed in a polyester carded web contained between hydrophilic fabric outer layers. The pad can absorb more than 100 times its dry weight in water and other aqueous liquids that form during iced food shipment.

5 Claims, 1 Drawing Sheet

ICED FOOD SHIPPING CONTAINER WITH AQUEOUS LIQUID ABSORBING PAD

BACKGROUND OF THE INVENTION

1. Field of the Invention

This invention relates to an iced food shipping container and to a composite nonwoven article for use therein which comprises superabsorbent polymer particles for absorbing aqueous liquids that form during shipment. More particularly, the invention concerns such a container wherein the liquid-absorbing article is in the form of a composite nonwoven fabric comprising a hydrophilic outer fabric that encloses a nonwoven web in which superabsorbent polymer particles are distributed.

2. Description of the Prior Art

Containers for use in shipping fresh food on ice are known in the art. A typical container has two internal compartments separated by a perforated support member. In use, the upper compartment contains ice, in which or on which fresh food is placed. Often, the lower compartment contains a pad which is intended to absorb any aqueous liquids that are released from the food or result from melting of the ice. Trapping of the aqueous liquids is especially important when fresh food, such as fish, live shellfish and the like, is being shipped. If some of the ice melts during shipment, the resulting liquid water plus aqueous liquids from the food itself can contaminate and spoil the food, if the liquids are not properly handled.

Several types of liquid-absorbing pads have been used to absorb and immobilize the aqueous liquids encountered during shipping of iced fresh foods. To increase the absorbing efficiency of the pad, absorbent particles of hydrocolloidal polymer (hereinafter referred to as "superabsorbent polymer" or "SAP") have been incorporated into pads that have been used commercially in iced food shipping containers. Such superabsorbent polymers are known. For example, U.S. Pat. Nos. 4,654,039 (Brandt et al), 3,670,731 (Harmon) and 3,669,103 (Harper et al) disclose such SAP particles being mixed with various fibrous and pulp materials for use in disposable diapers, sanitary napkins, incontinent pads, facial wipes and the like. When wetted with water, the SAP forms hydrogel, which is capable of holding water amounting to many times the dry weight of the dry SAP particles.

A known SAP-containing pad used in commercial iced food shipping containers comprises SAP powder contained between two nonwoven fabrics sealed together at their edges to form a pouch for the SAP powder. Some of the particles of the powder are adhered to the inner surfaces of the fabrics. However, because most of the SAP powder is loose within the pad, the powder often migrates to and concentrates in one part or near a sealed end of the pad. Such mal-distribution within the pad can lead to "gel blocking", a phenomenon characterized by rapid swelling of SAP particles in regions of high particle concentration. Such rapid swelling can prevent the other SAP particles from absorbing liquid, either because groups of the other particles become encapsulated with hydrogel, or because swollen hydrogel particles clog the pores of the outer fabric of the pad.

Another SAP-containing commercial absorber pad for use in iced food transportation employs a perforated plastic film which surrounds a lofty fabric that has SAP powder adhered to its surfaces. This commercial pad also has shortcomings. The film does not readily wick aqueous fluids, gel-blocking often occurs and the perforations in the film can become clogged quite easily. Efficient use of the SAP in the pad can thereby be significantly limited.

Accordingly, it is an object of this invention to provide a liquid-absorbing article for use in iced food shipping containers that eliminates or greatly reduces the above-described shortcomings of currently used commercial absorber pads.

SUMMARY OF THE INVENTION

The present invention provides an improved iced food shipping container and a novel liquid-absorbing pad for use in the shipping container. The container is of a known type which has water-impervious walls, an upper compartment for holding fresh food and ice, a lower compartment containing an aqueous liquid absorbing pad in which superabsorbing polymer is incorporated, the upper and lower compartments being separated by a perforated tray for supporting the food and ice and for permitting melted ice and other liquids to pass into the lower compartment. In accordance with the improvement of the present invention, the liquid-absorbing pad is a composite nonwoven article comprising a low density, lightly bonded, fibrous web. The fibrous web preferably is made up of binder and matrix fibers, the binder having a lower melting temperature than the matrix fibers and constituting no more than 25%, most preferably no more than 15%, of the total weight of the fibrous web. In a preferred embodiment, the binder is provided as the sheath of a sheath/core fiber. The fibrous web, which usually weighs in the range of 50 to 170 g/m$^2$, preferably 75 to 150 g/m$^2$, contains superabsorbent polymer granules dispersed therethrough. The weight of the superabsorbent particles is usually in the range of 25 to 125 g/m$^2$, preferably 50 to 75 g/m$^2$. The SAP-containing web is surrounded by a hydrophilic outer fabric, to which it is lightly bonded. The web is preferably is a carded web.

In various preferred embodiments of the invention, the pad comprises a staple-fiber web, of higher melting temperature (matrix) polyester fibers and lower melting temperature (binder) co-polyester fibers, or bicomponent fibers containing or sheathed with binder polymer, the SAP is derived from cross-linked polyacrylic acid and the hydrophilic outer fabrics are resin-bonded polyester nonwoven fabrics, and the web and the nonwoven fabrics each have a wetting agent applied to it.

In the absorbing pads of the invention, the SAP particles generally are well distributed, do not migrate and thereby avoid gel-blocking. In use in a shipping container, the pad generally can absorb aqueous liquids amounting to 75 or more times its own dry weight.

BRIEF DESCRIPTION OF THE DRAWINGS

The invention will be better understood by referring to the attached drawings wherein.

DETAILED DESCRIPTION OF PREFERRED EMBODIMENTS

Figure 1:
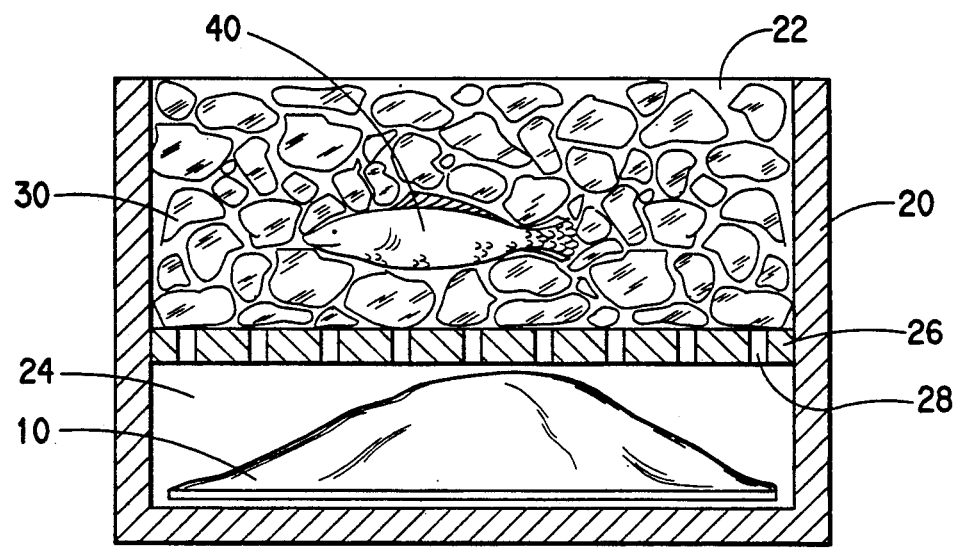
FIG. 1 is a schematic cross-section of a shipping container having water-impervious walls and bottom 20, an upper compartment 22 and a lower compartment 24, separated by a perforated support 26, the upper compartment containing ice 30 and food 40, the lower compartment containing water-absorbing pad 10.
Figure 2:
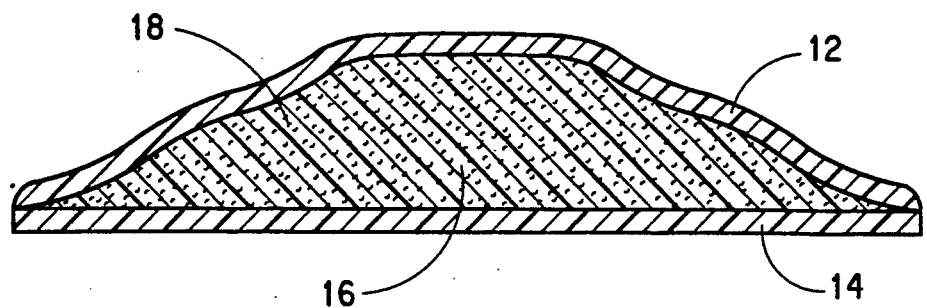
FIG. 2 is a detailed cross-section of pad 10 which comprises hydrophilic, porous outer layers 12 and 14 surrounding fibrous web 16 which contains particles 18 of superabsorbent polymer.

The invention will now be further described and illustrated by the following discussion of preferred embodiments. The description and example which follow are included for the purposes of illustration and are not intended to limit the scope of the invention, which is defined by the appended claims.

The fibrous web 16 into which the SAP powder, granules, fibers, particles or the like (referred to collectively hereafter as "particles" 18) are dispersed can be prepared from commercially available fiber and can be assembled by carding, air-laying, or the like to form the web. Web 16 usually has a weight in the range of 50 to 170 g/m$^2$, preferably 75 to 150 g/m$^2$. The individual staple fibers of the web can have the same or different compositions, lengths and decitex. Fibers having an average length in the range of 3.5 to 10 cm are suitable. Lengths averaging in the range of 4 to 6 cm are preferred for good cotton-system carding. Fibers having an average decitex in the range of 1 to about 15 are suitable; a range of 3 to 7 is preferred.

In one embodiment of the invention, the web comprises two types of fibers, matrix fibers and binder fibers. The binder fibers have a lower melting temperature than the matrix fibers, usually by 3° to 50° C. For example, the matrix fibers can be of polyethylene terephthalate homopolymer and the binder fibers can be of an 80/20 polyethylene terephthalate/isophthalate copolymer. The binder fiber of such a web usually amounts to no more than 25% of the total weight of the web, but preferably amounts to no more than 15%. The average decitex of the binder fiber preferably is smaller than that of the matrix fiber. The smaller the decitex of the binder fiber, the smaller percent of the total amount needed for satisfactory bonding of the web. The binder fiber can be incorporated into the web conveniently, by "coforming", that is by intimately and uniformly blending matrix and binder fibers prior to forming the web itself.

A preferred way of incorporating binder into the web, illustrated in the example below, involves the use of sheath-core bicomponent fibers, the sheaths of which are of binder polymer and the cores of which are of matrix fiber polymer. For use in the absorbers of the present invention, the fibers of the thusly formed webs are lightly bonded together by the application of heat, optionally with the simultaneous application of pressure to the web.

The use of eccentric bicomponent fibers, sheath/core fibers, crimped fibers or the like in the web permits easy "bulking" of the web. By easy bulking is meant that a web which was temporarily compacted during processing can be readily increased thickness, usually by applying heat, without pressure, to the web. The light bonding of the fibers together allows the web to increase in volume without delamination or other detrimental effects to the web. The light bonding also maintains the integrity of the web after the SAP particles which are incorporated therein become swollen by absorbed aqueous liquids.

The lightly bonded web, just prior to having the SAP particles incorporated in it, is sufficiently open, porous and/or voluminous to permit SAP particles to be distributed efficiently throughout the web. The objective is a uniform dispersion of the particles throughout the web, without excessive SAP-particle concentration gradients in the longitudinal and transverse directions of the web and preferably through the thickness as well.

Conventional methods and equipment are available for bonding the fibers into lightly bonded voluminous webs and for distributing particles therein. For example, published European Patent Application 88306757.1 (Seals), the entire disclosure of which is hereby incorporated by reference, illustrates such known methods. By applying the known techniques, the SAP-containing webs for use in the absorbing pads of the invention are sufficiently open for hydrogel that is formed when aqueous liquids are absorbed to substantially uniformly and completely fill the available interstitial volume of the pad without damaging its integrity.

For use in the absorber of the present invention, the superabsorbing polymer is preferable in particulate or granular form, because of the ease with such forms can be handled and dispersed in the webs with commercially available powder applicators or spreaders. The polymer of the SAP particles can be selected from a wide variety of such polymers, such as those disclosed in U.S. Pat. No. 4,897,297 (Zafiroglu) column 3, lines 8-63, which disclosure is hereby incorporated by reference. Preferably, the SAP polymer is a derivative of a polyacrylic acid (e.g., "Sanwet" J-400, sold by Sanyo). Suitable SAP particles for use in the present invention will absorb aqueous liquid amounting to many times its own dry weight. The SAP and absorbed aqueous liquids form a highly viscous gel which remains in place within the web. The SAP particles, prior to exposure to moisture, generally have a weight-average size of about 75 to 800 microns, preferably about 100 to 500 microns. Generally, the SAP amounts to about 5 to 50 per cent by weight of the composite article, preferably about 25 to 40%. The higher the absorption capacity of the SAP particles, the smaller the amount of of SAP that is needed, all other factors being about the same. However, care should be exercised in selecting the amount and particular SAP for use in the web to avoid detrimental effects on (a) bulking of the web, (b) adhering of the web to the hydrophilic outer fabric of the pad, and (c) cutting and edge sealing of the outer fabric of the pad.

The porous, hydrophilic outer fabric layers 12, 14 of water-absorbing pad 10 fabric perform three functions; namely, (1) expandably contain the SAP-containing web, (2) to wick and help distribute aqueous fluids over the entire area of the absorbing pad and (3) to facilitate sealing of the cut edges. The expandability should be commensurate with the expected expansion of the SAP-containg web. Various nonwoven fabrics can perform these functions. A particularly preferred outer fabric is a nonwoven fabric made from polyester homopolymer fibers and polyester copolymer (binder) fibers and/or a binder resin, the fabric surface having been treated with a wetting agent. The binder fiber and/or resin ensures adequate bonding of outer fabric 12, 14 to the SAP-containing web 16. The wetting agent aids in the wicking and distribution of aqueous liquids in pad 10. If most of the fibers of the outer layer fabric are not hydrophilic (e.g., polyesters, polyolefins), as in the preferred nonwoven outer fabric, then hydrophilic fiber, for example of wood-pulp, cellulose acetate or the like, can be incorporated into the outer fabric or the fabric can be treated with a wetting agent (e.g., cationic, anionic, nonionic or amphoteric surfactant) to impart the desired hydrophilicity. Conventional criteria and methods can be used for selecting and applying such materials to the fabric.

The liquid-absorbing pads 10 of the invention can be readily fabricated by the following steps. A layer of outer fabric 14 is placed on a flat surface (e.g., a horizontal conveyer belt). A fibrous web 16 is placed atop of fabric 14. SAP particles 16 are distributed onto the web. A second outer fabric layer 12 is placed atop the SAP-containing web in a manner that causes the edges of outer fabric layers 12 and 14 to overlap in face-to-face relationship. By heating the thusly formed assembly under light pressure (e.g., between heated platens of a press or between heated rolls of a calender nip) the inner surfaces of outer nonwoven fabric layers 12 and 14 can be bonded to SAP-containing web 16. If the pressing operation compressed the assembly excessively, further heating of the assembly without restraint, for example in a hot air oven, can increase the thickness and volume of the assembly. The thusly prepared assembly are then cut to desired dimensions, preferably with a heated edge provided for example by a heated die, a hot knife or the like, and cut edges of the outer fabric layers are thereby simultaneously heat-sealed, or the edges can be adhered to each other and sealed by other conventional techniques.

When aqueous absorbing pad 10 is used in an iced food shipping container, for example of the type illustrated in FIG. 1, pad 10 is placed in lower compartment 24 beneath perforated support tray 26. Then, during shipment of of the iced food, liquid water from food 40 or melting ice 30 is readily absorbed and immobilized by pad 10. Pads of the invention can readily absorb water amounting to many times the dry weight of the pad, sometimes as much as 50 to 100 times the weight. It is also found that because of the manner in which SAP particles 18 are distributed in web 16, the particles do not migrate and concentrate in any part of the interior of the pad. Further, the hydrophilic and porous character of outer fabric layers 12 and 14 draws the liquid into the SAP-containing web and prevents liquid from moving and splashing around in the shipping container.

EXAMPLE

The example illustrates the preparation of an absorbing pad of the invention and demonstrates its ability to absorb and immobilize large quantities of water efficiently.

A carded web weighing 2.1 oz/yd$^2$ (71 g/m$^2$) and comprising 75% of 6.5-denier (7.2-dtex), 2-inch (5.1-cm) long polyester staple fibers (KODEL 430 sold by Eastman) and 25% of 3-denier (3.3-dtex), bicomponent sheath/core (polyethylene/polyester) binder fiber (sold by BASF Corp) was laid atop a first 1.13-oz/yd$^2$ (38.3-g/m$^2$), resin-bonded, nonwoven polyester fabric (sold by HDK Industries, Inc. of Rogersville, Tenn.) which had been coated with Triton X-114 wetting agent (sold by Rohm and Haas Co) amounting to 0.4 weight % add-on. Superabsorbent powder J-400 Grade (sold by Sanyo Corporation of America) was then evenly dropped onto the web at a rate of 60 grams per square yard (72 g/m$^2$). The thusly assembled components were then passed through a 45-foot-long (13.7-meter-long) oven which was heated to a temperature of 177° C. to soften the resin and bicomponent binder fiber. A second resin-bonded, 1.13-oz/yd$^2$ nonwoven polyester fabric, similar to the first nonwoven polyester fabric, but additionally containing about 25% by weight of the above-described bicomponent binder fiber, was laid on top of the web as it exited the oven. The composite then was passed through a nip-roll to lightly bond the various layers to each other at their interfaces. Then, the pad was passed through a 35-foot-long (10.7-m-long) oven at 177° C. to allow the SAP-containing web to expand in thickness and volume. The thusly prepared lightly bonded pad weighed a total of 6.5 oz/yd$^2$ (220 g/m$^2$) and was 2.3-mm thick. Web thickness was measured with a Federal Model C81S gauge (sold by Federal of Providence, R.I.).

A sample pad, measuring 6-inches long and 6-inches wide (15.2 by 15.2 cm, 0.023 square meters, total weight 5 grams) was placed in ice water for 30 minutes during which time the composite swelled to over 24 mm in thickness. Total water pick-up was 499 grams. This absorption was equivalent to almost 100 times the weight of the dry composite or about 300 times the weight of the SAP particles.

Another sample pad of the same dimensions as in the preceding paragraph was thermally sealed along its edges with a hot wire impulse sealer (as sold by Clamco Corp of Cleveland, Ohio). The sealed composite was placed into ice water for 30 minutes during which time it swelled to over 25 mm in thickness and absorbed a total of 509 grams of water, again about 100 times the dry weight of the pad and 300 times the weight of the dry SAP particles contained in the pad. The seal around the edges remained intact.

I claim:

1. A composite nonwoven article, particularly suited for use in an iced food shipping container, comprising a fibrous, lightly bonded nonwoven web having superabsorbing powder granules dispersed therethrough, the web being enclosed within a hydrophilic outer fabric and lightly bonded thereto, the lightly bonded nonwoven web being a carded web having a dry weight in the range of 50 to 170 grams per square meter and comprising binder and matrix fibers, the binder having a lower melting temperature than the matrix fibers and constituting no more than 25% of the total weight of the fibrous web, the superabsorbing particles having a dry weight in the range of 25 to 125 g/m$^2$, and a weight average size in the range of about 75 to 800 microns, the particles amounting to 5 to 50 percent of the weight of the composite article, and the composite nonwoven article being capable of absorbing aqueous liquids amounting to at least 75 times its own dry weight.

2. An article in accordance with claim 1 wherein the matrix fibers are of polyester homopolymer and the binder is in the form of copolyester binder fibers dispersed throughout the web.

3. An article in accordance with claim 1 wherein the binder is in the form of a sheath of a sheath/core fiber.

4. An article in accordance with claim 3, wherein the sheaths constitute about half of the total weight of the sheath/core fiber.

5. An article in accordance with any one of claims 1 through 4 wherein the superabsorbing powder is derived from a cross-linked polyacrylic acid, the hydrophilic outer fabric is a resin-bonded polyester nonwoven fabric, and the fabric having a wetting agent therein.

* * * * *